(12) United States Patent
Mikonaho

(10) Patent No.: US 7,681,701 B2
(45) Date of Patent: Mar. 23, 2010

(54) VIBRATION DAMPER, A METHOD OF PRODUCING A VIBRATION DAMPER AND A DAMPENING ARRANGEMENT FOR DAMPENING THE VIBRATIONS OF AN ENGINE

(75) Inventor: Heikki Mikonaho, Turku (FI)

(73) Assignee: Wärtsilä Finland Oy, Vaasa (FI)

( * ) Notice: Subject to any disclaimer, the term of this patent is extended or adjusted under 35 U.S.C. 154(b) by 723 days.

(21) Appl. No.: 10/575,609

(22) PCT Filed: Oct. 12, 2004

(86) PCT No.: PCT/FI2004/050147

§ 371 (c)(1),
(2), (4) Date: Apr. 12, 2006

(87) PCT Pub. No.: WO2005/038288

PCT Pub. Date: Apr. 28, 2005

(65) Prior Publication Data

US 2007/0080035 A1    Apr. 12, 2007

(30) Foreign Application Priority Data

Oct. 20, 2003    (FI) .................................. 20031531

(51) Int. Cl.
*F16F 7/10* (2006.01)
(52) U.S. Cl. ....................................... 188/380; 188/317
(58) Field of Classification Search ......... 188/378–380, 188/317, 316, 318; 267/140.13, 136; 248/559
See application file for complete search history.

(56) References Cited

U.S. PATENT DOCUMENTS

| 3,173,514 | A | * | 3/1965 | Tiedemann .................. 188/378 |
| 4,004,757 | A | * | 1/1977 | Doman .................... 244/17.13 |
| 5,374,025 | A | * | 12/1994 | Whelpley et al. ........... 248/550 |
| 5,816,373 | A | * | 10/1998 | Osterberg et al. ........... 188/380 |
| 5,984,233 | A | | 11/1999 | Snyder, Jr. et al. |
| 6,443,273 | B1 | | 9/2002 | Ledbetter et al. |
| 6,454,063 | B1 | | 9/2002 | Osterberg et al. |

FOREIGN PATENT DOCUMENTS

| EP | 0 353 091 | 1/1990 |
| EP | 0 214 825 | 3/1997 |
| EP | 1 060 932 | 12/2000 |
| GB | 468365 | 6/1937 |
| SU | 1809203 A1 * | 4/1993 |

* cited by examiner

*Primary Examiner*—Xuan Lan Nguyen
(74) *Attorney, Agent, or Firm*—Chernoff, Vilhauer, McClung & Stenzel

(57) ABSTRACT

A vibration damper comprising a body part via which the damper can be fastened to the object to be dampened, an oscillating piece movably arranged in the space of the body part and fastened by at least one spring to the body part, the oscillating piece consisting of more than one part, removably fastened to each other. The invention also relates to a method of producing a vibration damper and an arrangement of reducing the vibration in a piston engine.

8 Claims, 3 Drawing Sheets

VIBRATION DAMPER, A METHOD OF PRODUCING A VIBRATION DAMPER AND A DAMPENING ARRANGEMENT FOR DAMPENING THE VIBRATIONS OF AN ENGINE This is a national stage application filed under 35 USC 371 based on International Application No. PCT/FI2004/050147 filed Oct. 12, 2004, and claims priority under 35 USC 119 of Finnish Patent Application No. 20031531 filed Oct. 20, 2003.

BACKGROUND OF THE INVENTION

The present invention relates to a vibration damper the damper comprising a body part, by means of which the damper can be fastened to the object to be dampened, an oscillating piece movably arranged in the space of the body part, the oscillating piece being connected to the body part by at least one spring.

The invention also relates to a method for producing a vibration damper.

The invention further relates to a vibration dampening arrangement of an engine.

The vibration of a piston engine is known as such, and in order to reduce it, there are a number of various solutions, such as balancing solutions. In engines there can be noted vibration forms of which both the engine and the auxiliaries attached in connection therewith, such as a compressor or compressors, are part of. In this case it is a matter of a global vibration form, i.e. the engine and its subconstruction/s together form a vibration system. The engine can also include local vibration of a certain auxiliary, whereby the dynamic properties of the auxiliary are determining as far as the vibration is concerned.

Control of local vibrations is usually easier than control of global vibrations of the whole construction. In local vibration the rigidity, fastening, mass etc. can be modified more easily. In the control of the global vibration of the engine, however, the need for modification can be directed at the engine itself, whereby it may be required to increase the rigidity of the cylinder block etc. This is, naturally, impossible, in case there is a desire to use standard engine components. The viewpoint of costs must also be considered when looking for new solutions.

In all types of vibration, the mass and gas forces of the engine act as the stimuli of the engine. A special difficulty in vibration dampening of engines is that the vibration properties of engines of different sizes (number of cylinders, cylinder diameter etc.) differ from each other. Further, the engine running speed also has an effect on the vibration.

In order to dampen the vibrations, U.S. Pat. No. 5,816,373, for example, discloses a solution, in which an oscillating piece is arranged between springs in a space containing compressible gas. Because the operation of the damper depends on, among others, the mass of the oscillating piece and its dimensions (throttling), the properties of the gas and the properties of the springs, such a solution will always have to be dimensioned and produced individually for dampening a vibration of a certain frequency.

The aim of the present invention is to produce a vibration damper minimizing the problems associated with prior art.

Another aim of the invention is to produce a vibration damper the dampening properties of which can easily be changed even after the manufacture.

SUMMARY OF THE INVENTION

The basic idea of the invention is that the oscillating piece consists of more than one part, removably fastened to each other. Thus, the oscillating piece can be assembled so as to have a desired mass by using certain components having a standard shape.

Preferably the oscillating piece comprises two end pieces and a number of intermediate pieces arranged between the end pieces. In various applications the end pieces are preferably always similar and the final total mass of the oscillating piece is determined by the choice of the intermediate pieces. Preferably the intermediate pieces comprise adjustment discs and/or support sleeves, the length of which in each case depends on the amount of adjustment discs. The oscillating piece is essentially cylindrical in shape and it comprises a through-hole parallel with the longitudinal axis thereof for supporting it to the housing construction. The outer circumference of the oscillating piece is located a small distance away from the body part.

The oscillating piece is essentially cylindrical in shape and it comprises a through hole parallel with the longitudinal axis thereof for supporting the oscillating piece to the body part. Additionally, bearing means for the oscillating piece have been arranged in connection with the end pieces.

The body part of the oscillating piece comprises a cylindrical space limited by the first and second end walls. The guide shaft of the oscillating piece is located on the place of the center axis of the cylindrical space, the guide shaft extending from the first end wall to the second end wall. The guide shaft comprises a space extending essentially the whole length of the guide shaft. Adjacent the opposite ends of the space are openings forming a flow connection between the space of the guide shaft and the space of the body part on different sides of the oscillating piece. This kind of construction enables the movement of the oscillating piece to cause a flow of dampening medium via the space of the guide shaft into the space of the body part on different sides of the oscillating piece according to its movement and position.

The flow of the dampening medium can be effected on, because in connection with the space of the guide shaft there are means for adjusting the flow connection between the space of the guide shaft and the space of the body part.

The oscillating piece is arranged to be supported to the first and second end walls by springs.

In a method according to the invention for producing a vibration damper, in which method an oscillating piece is arranged in the space of the body part by means of at least one spring, the oscillating piece is formed by joining a number of pieces to each other.

In an arrangement according to the invention for dampening the vibration of an engine comprising at least one auxiliary, in which arrangement the said at least one auxiliary is rigidly attached to the said engine, a vibration damper has been arranged in connection with the said at least one auxiliary. Preferably the dampening arrangement comprises means for controlling the temperature, the means being connected to the medium circulation of the engine.

BRIEF DESCRIPTION OF THE DRAWINGS

In the following the invention is described by way of example and with reference to the appended schematic drawings, of which

DETAILED DESCRIPTION

Figure 1:
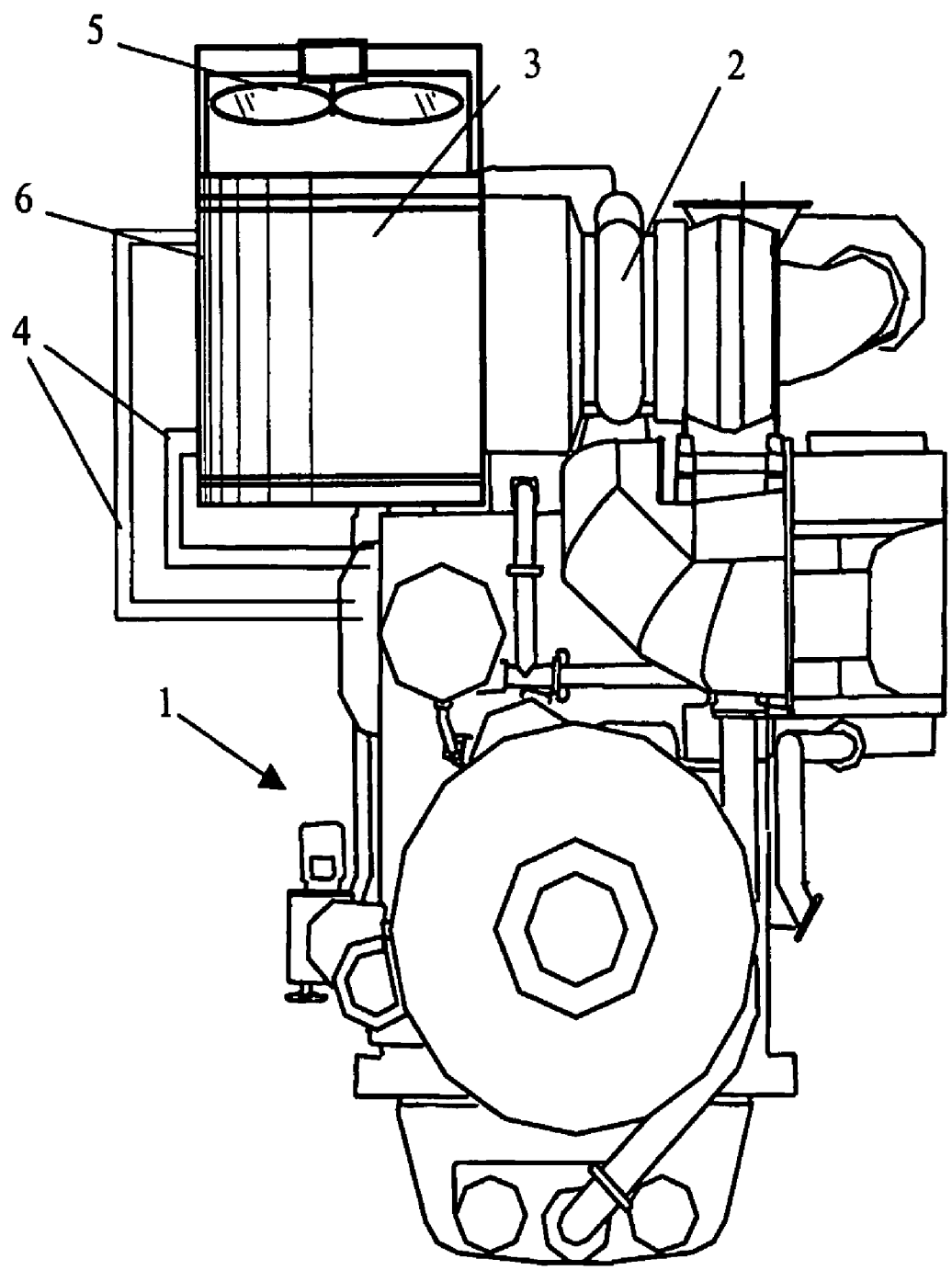
FIG. 1 is an illustration of a vibration damper in connection with an engine.

FIG. 1 is a schematic illustration of a piston engine 1 comprising a turbocharger 2. According to the invention a vibration damper 3 has been arranged in connection with the turbocharger of the engine 1. It is rigidly attached to the turbocharger 2 or its support structure. This means that no essentially flexible special spacer is used in connection with the attachment. The vibration levels of both the engine and the turbocharger can be reduced on the desired frequency range by means of the vibration damper. In order to keep the operation of the vibration damper stable as far as temperature is concerned, it is provided with temperature control means 4, 5, 6. The temperature control means can be implemented by providing the actual damper 3 with a shell construction 6 being in connection to the medium circulation, such as lubrication and cooling system, of the engine via channels 4. In some cases the damper can also be provided with a fan 5, by means of which the cooling can be accomplished.

Figure 2:
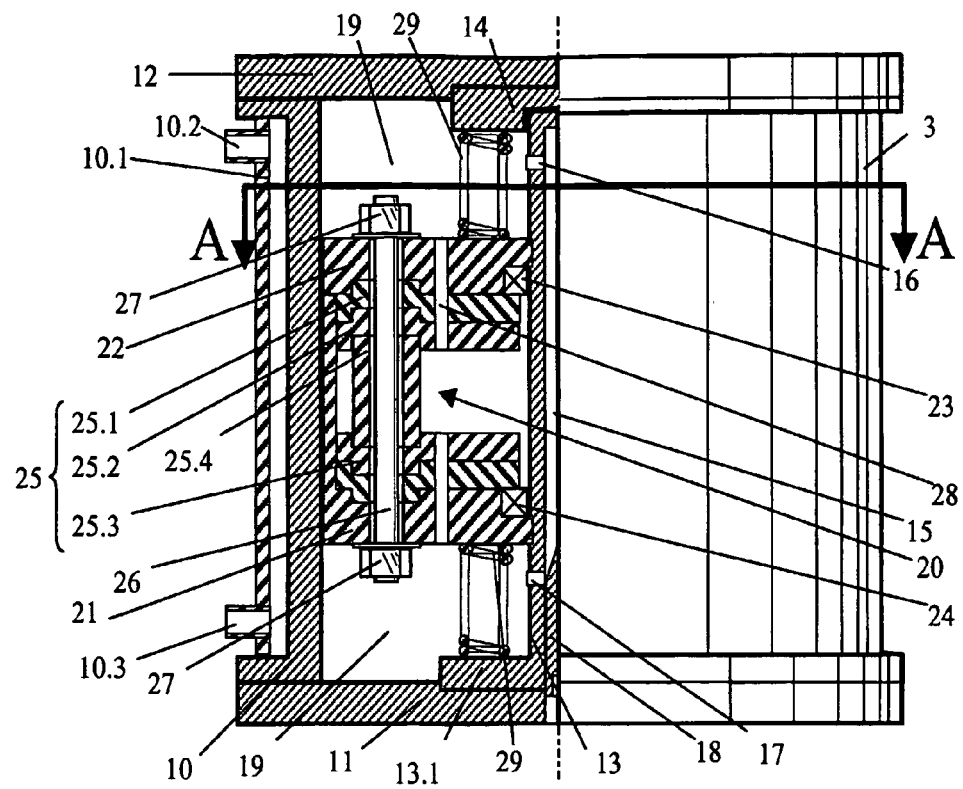
FIG. 2 illustrates an embodiment of the vibration damper according to the invention.
Figure 3:
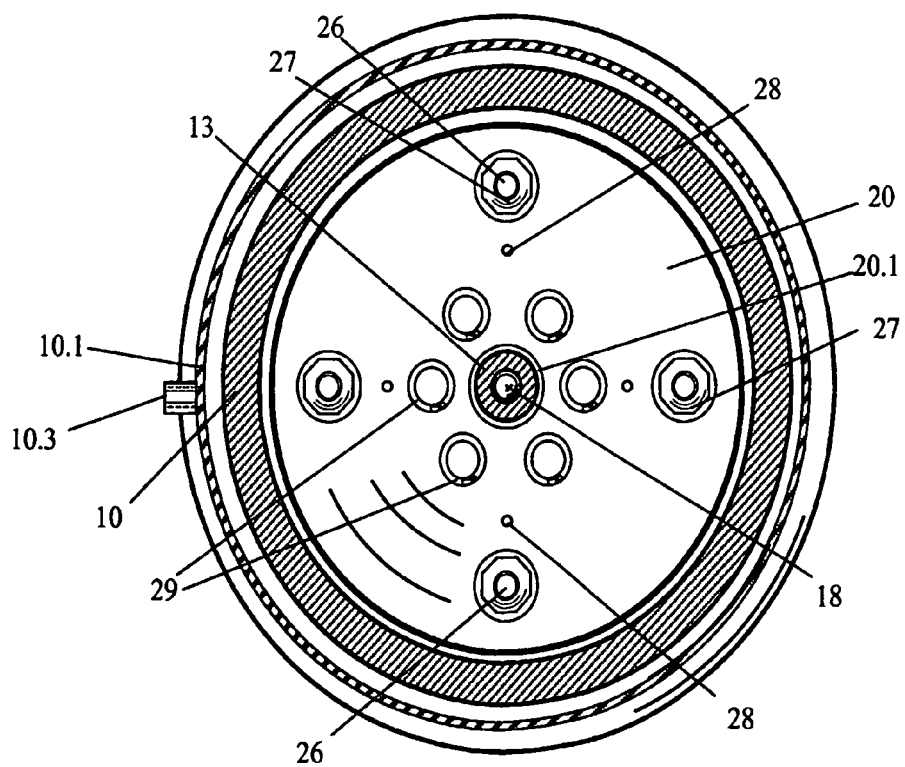
FIG. 3 illustrates section A-A of FIG. 1.

FIGS. 2 and 3 show the vibration damper 3 of FIG. 1 in more detail. The damper comprises a body part, into which a closed space 19 has been arranged by means of first 11 and second 12 end walls. The cross-section of the space 19 and the body part is preferably round. The end walls are fastened to the body part in a suitable way, such as bolting (not shown in figures) and so that the mating surface is tight. A guide shaft 13 is arranged in the space 19 inside the damper 3, on the center axis thereof, the guide shaft extending essentially from the first end wall 11 to the second end wall. An oscillating piece 20, i.e. a piston, has been arranged on the guide shaft movably along its longitudinal axis, the oscillating piece comprising a through hole 20.1 parallel with its longitudinal axis, by means of which the oscillating piece is fitted on the guide shaft. The guide shaft is arranged on the center line of the body part of the damper. A fastening flange 14 supporting the guide shaft to the end wall is arranged in the end of the guide shaft 13 adjacent the second end wall. The guide shaft and the fastening flange 14 are arranged in a recess provided in the end wall.

A space 15 has been arranged in the guide shaft, the space extending from one end of the guide shaft almost through it. Preferably the space is made by boring. Additionally, openings 16, 17 have been arranged in the wall 13 of the guide shaft, by means of which a flow connection is formed between the space 15 of the guide shaft and both sides of the oscillating piece of the space 19 of the body part. Thus, as the oscillating piece moves, dampening medium can flow from one side of the oscillating piece to other side thereof. The other end of the guide shaft is provided with an adjustment screw or needle 18, which is arranged together with the flow opening 17 so that the flow opening 17 can be blocked, i.e. throttled, by means of the adjustment screw or needle 18. By means of this arrangement it is possible to effect the flow of dampening medium in the space 19 as the oscillating piece moves and thereby to effect the dampening properties of the vibration. The dampening medium is chosen according to the dampening effect needed in each case, it can be a suitable gas or liquid, such as oil.

In the shell construction 6 a second outer shell 10.1 has been arranged in connection with the outer surface of the body part 10, the shell 10.1. forming a space for the cooling medium in the body part 10. There are also connection conduits 10.2, 10,3 provided in connection with the outer shell for directing cooling medium into the space and away from there. These allow the use of cooling medium for controlling the temperature of the body part and the whole of the damper and maintaining it at the desired level. The temperature has an effect on the operation of the apparatus by having an effect on the viscosity of the dampening means.

The oscillating piece 20 is supported by a spring system comprising at least one spring 29 to the first and second end walls either directly or via the collar part 13.1 of the guide shaft and the fastening flange 14, as shown in FIG. 2. Here, the spring system comprises a number of separate springs on both sides of the oscillating piece. According to the invention the oscillating piece is formed by a number of parts, improving the possibilities of tuning the vibration damper.

The oscillating piece 20 comprises a body part 21 and a cover part 22. A bearing arrangement 23, 24 between the oscillating piece and the guide shaft 13 has been provided in connection with the above-mentioned parts so that both the body part 21 and the cover part comprise the bearing arrangement 23, 24. A number of intermediate parts 25, i.e adjustment discs 25.1-25.3 are provided between the body part and the cover part, by means of which the mass of the oscillating piece can be influenced. The intermediate parts are located between the body part 21 and the cover part 22 and in the embodiment shown in FIG. 2 they are all fastened by means of threaded bars 26 and nuts 27 to form an assembly. Here, a certain space, i.e. a longitudinal distance, remains between the body part 21 and the cover part 22, and if the desired total mass does not necessitate the use of intermediate pieces in such an amount that the whole available space is filled, a support sleeve 25.4 is used in connection with the threaded bar. This accomplishes, among others, the advantage that a mass necessary for tuning of the damper in each case can be arranged in the space between the body and cover parts produced in standard sizes. The mass of the oscillating piece can be varied by arranging a different number of intermediate pieces. It is also possible to produce the intermediate pieces from materials having different densities. Thus the mass of the oscillating piece can be varied without changing its external dimensions, whereby it is possible to standardize the physical dimensioning. It is, however, important that all parts of the oscillating piece are immovable in relation to each other. The shape of the body part 21, cover part 22 and the intermediate parts 25 can differ from those shown in the figures; it is however, essential that they are rotationally symmetrical in shape and their center of mass in on the center shaft.

Flow paths 28 can be arranged in the oscillating piece for the dampening medium filling the space 19, whereby the movement of the oscillating piece can cause it to flow along the flow path. The dampening medium can correspondingly flow via the flow openings 16 and 17 and the space 19. The flow via this path, along with the dampening effect of the oscillating piece, can be adjusted by changing the position of the adjustment screw or needle 18.

Figure 4:
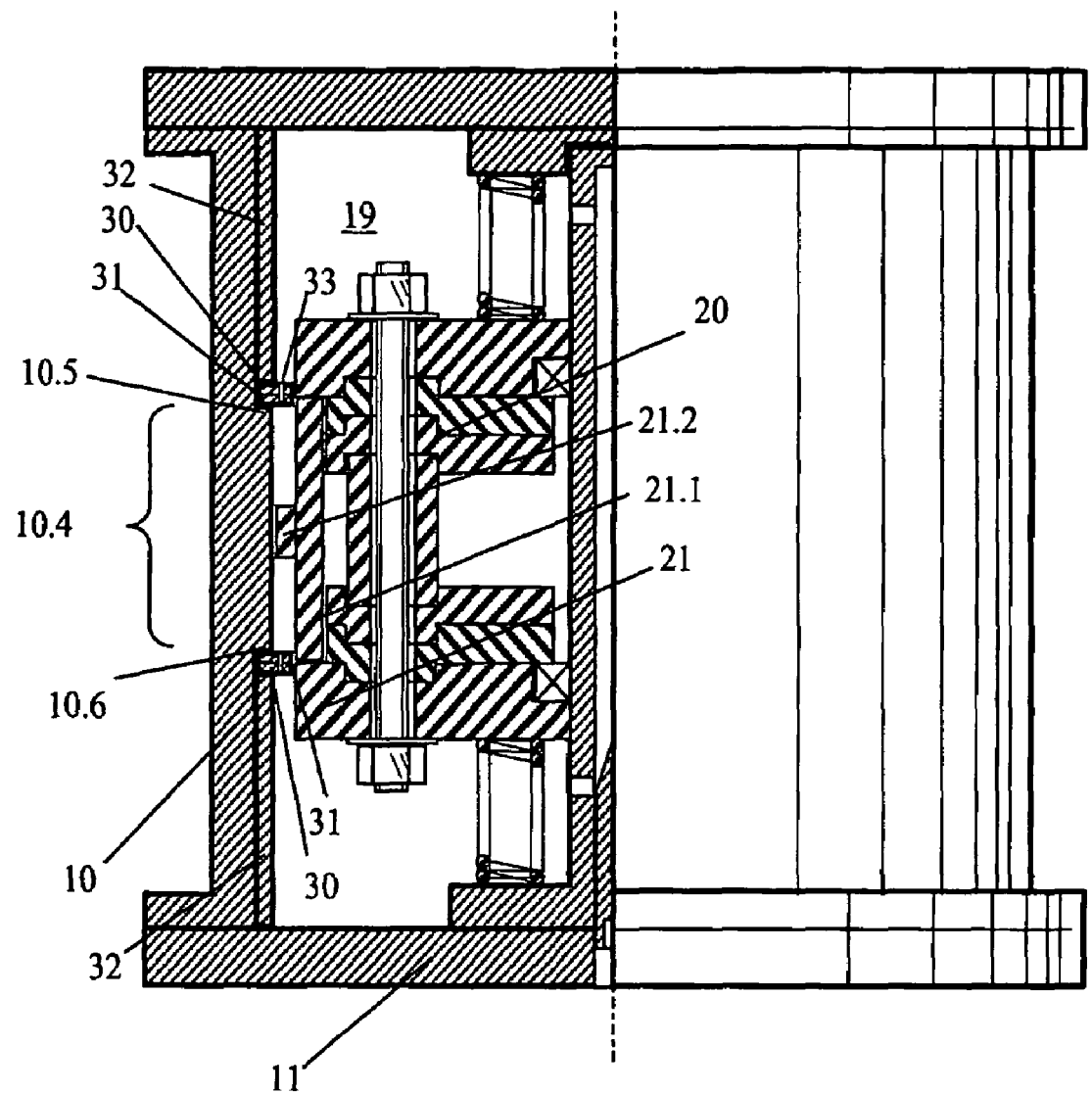
FIG. 4 illustrates another embodiment according to the invention.

FIG. 4 shows another embodiment of the vibration damper according to the invention. It corresponds in structure to that shown in FIG. 2, and in the following, reference is generally made only to the features differing from those of FIG. 2. Here, the body part 10 is provided with an area 10.4 having a smaller diameter, the area forming an upper and a lower (in the figure) shoulder 10.5, 10.6. Here, two superimposed rings 30, 31 are arranged against the shoulders, the fastening of the rings being secured by sleeves 32. The rings extend in the space 19 towards the centre so that there's only a small clearance between them and the oscillating piece 20. The clearance acts as a flow path and a throttling point for the dampening medium. On the other hand, a clearance defined by about the rings 30, 31 remains between the oscillating piece and the body part 10. A projection ring 21.2 is arranged on the outer circumference of the oscillating piece, extending around it, in the area in the direction of the longitudinal axis between the rings, the projection ring being formed to a shell 21.1 separate from the body part 21 of the oscillating piece. The shell and the body part can be an integral piece as well, as shown in FIG. 2. The projection ring 21.2 on its part functions as a throttling point of the dampening medium and has an effect on the tuning of the vibration dampening of the apparatus.

In order to dampen the movement of the oscillating piece the rings 30, 31 are provided with through-holes 33 along the circumference thereof, the size and location which can be used to influence the flow, i.e. throttling, of the medium. The openings of the superimposed rings can be of different sizes and partly overlapping, which improves the adjustability of the throttling. The position of the openings 33 can be moved by rotating the rings in relation to the center axis to a suitable position in relation to each other.

During operation, the oscillating piece of the damper produces a reaction force as it oscillates back and forth on the guide shaft in the space 19. The magnitude, frequency and phase angle of the reaction force can be effected on by changing the mass of the oscillating piece, by changing the spring constant of the spring system and by the dampening medium filling the space 19 and the flow thereof. The vibration damper transforms vibration energy into heat, formed as the dampening medium flows in narrow throttling points from one space to another forced by the vibrating piston.

The invention is not limited to the embodiments described here, but a number of modifications thereof can be conceived of within the scope of the appended claims.

I claim:

1. A vibration damper comprising:
    a body part via which the damper can be fastened to an object to be dampened, the body part defining an interior space,
    a guide shaft disposed in the interior space of the body part,
    an oscillating piece comprising a plurality of parts removably fastened to each other, the oscillating piece being disposed in the interior space of the body part, whereby the oscillating piece divides the interior space of the body part into two regions, at opposite sides respectively of the oscillating piece, and the oscillating piece being movable relative to the body part, movement of the oscillating piece being guided by the guide shaft, and
    at least one spring fastening the oscillating piece to the body part,
    and wherein the guide shaft comprises a wall defining an interior space of the guide shaft, and the wall of the guide shaft is formed with openings for forming a flow connection between the interior space of the guide shaft and the two regions of the interior space of the body part,
    and further comprising an adjuster for adjusting the flow connection between the interior space of the guide shaft and the interior space of the body part.

2. A damper according to claim 1, wherein the oscillating piece comprises two end pieces and a number of intermediate pieces between the two end pieces.

3. A damper according to claim 2, comprising bearings for the oscillating piece arranged in connection with the two end pieces.

4. A damper according to claim 2, wherein the intermediate pieces comprise adjusting discs and support sleeves.

5. A damper according to claim 1, wherein the oscillating piece is essentially cylindrical in form, having a longitudinal axis, and defines a through-hole parallel with the longitudinal axis.

6. A damper according to claim 1, wherein the body part comprises first and second end walls bounding the interior space of the body part, the interior space of the body part is cylindrical, having a central axis, the guide shaft is disposed on the central axis of the cylindrical space, and the openings formed in the wall of the guide shaft are adjacent opposite respective ends of the guide shaft.

7. A damper according to claim 6, comprising springs supporting the oscillating piece relative to the first and second end walls.

8. A damper according to claim 6, comprising first and second axially aligned coil springs, disposed in the two regions respectively of the interior space of the body part, supporting the oscillating piece relative to the first and second end walls.

* * * * *